INVENTOR.
T. D. MORGAN

BY Hudson & Young
ATTORNEYS

Patented Sept. 29, 1953

2,653,620

UNITED STATES PATENT OFFICE 2,653,620

PROCESS AND MEANS FOR REGULATING THE GAS PRESSURE IN CONTAINERS

Thomas D. Morgan, Oak Ridge, Tenn., assignor to Phillips Petroleum Company, a corporation of Delaware Original application January 4, 1949, Serial No. 69,226, now Patent No. 2,582,647, dated January 15, 1952. Divided and this application August 3, 1951, Serial No. 240,244

8 Claims. (Cl. 137—14)

This invention relates to methods of and means for regulating the gas pressure in containers. In one aspect it relates to combinations and subcombinations of evacuating means, gas supply means, conduit means, pressure regulating valve means and/or restricted orifices for controlling gas flow in a conduit. The invention also relates to methods of determining changes in the composition of a gas and apparatus for carrying out the method as claimed in the patent application mentioned in the following paragraph.

Claims relating to method and means for indicating changes in the composition of a gas and claims to the combination of a gas pressure regulating means and a specific ionization gauge means, and to the ionization gauge means per se, have been allowed in my copending application Serial No. 69,226, filed January 4, 1949, now U. S. Patent 2,582,647 of January 15, 1952, which application is the parent application of which the present application is a division.

It has been observed that the sum of the ions in a mass spectrum varies from one gas to another. This sum is proportional to the total number of positive ions formed when a gas is bombarded by low speed electrons.

Many complicated means have been proposed in prior art for determining when the composition of a gas, such as a stream of gaseous product coming from a process in a plant, changes in composition, in order to monitor the process by indicating that the process is continuing as planned. When the composition of the gas varies, the process involved is not operating properly, and changes are made to restore the operation to normal. Prior art devices testing the stream of gas generally have relied on analysis of the gas by means of spectrographic analysis, chemical analysis, analysis by mass spectrometer, or some other relatively complicated and slow form of analysis.

The present invention gets away from such complicated and expensive means of analysis by relying on the simple fact that each gas forms a different number of positive ions when bombarded under the same conditions by low speed electrons. The present invention also avoids indicating false changes in the composition of the gas caused by irregular thermal cracking of the original gas into other gases by contact with the filament from which the low speed electrons are being supplied. This is avoided by means of a novel arrangement of the filament, grids and plate so that the gas entering the test apparatus is subjected to low speed electron bombardment and the current is set up in the positive ions of the gas between a first grid and the plate before the gas passes through said first grid into contact with the heated filament. The gas which has contacted the heated filament and become thermally cracked is removed from the system from the other side of the grid from the gas which is conducting the indicating current.

A principal object of this invention is to provide suitable methods of and suitable means for supplying gas to containers at a regulated pressure.

One object of my invention is to provide an improved method of detecting and indicating differences in the composition of a gas.

Another object is to provide improved apparatus for carrying out such a method.

Another object is to provide such a method and apparatus in which the positive ions conducting the current are bombarded by low speed electrons without coming in contact with any heated element which would change their composition by thermal cracking or the like.

Another object is to provide an improved method and means of detecting a difference in the composition of the gas by measuring an ionization current in said gas in an improved ionization tube.

Another object of the invention is to detect and indicate changes in the tube of a gas stream and thereby to qualitatively determine the gas causing the deviation from the indication given by a gas of standard composition.

Another object is to indicate changes in the composition of a gas to provide a monitor which indicates when changes in a process of producing a gas should be made.

With a pure gas an object of the invention is to give an indication of the presence of impurities in said gas.

With binary mixtures of gases an object of the invention is to analyze the mixture to determine the exact percentage of each gas present.

With mixtures of known gases an object of the invention is to analyze the mixture to determine the exact percentage of each gas present.

Another object is to provide an improved gas ionization tube which is rugged, simple in composition, is not effected by products of thermal cracking, and which is relatively cheap and easy to operate.

Numerous other objects and advantages will be apparent upon reading the accompanying specification, claims and drawings.

Figure 1:
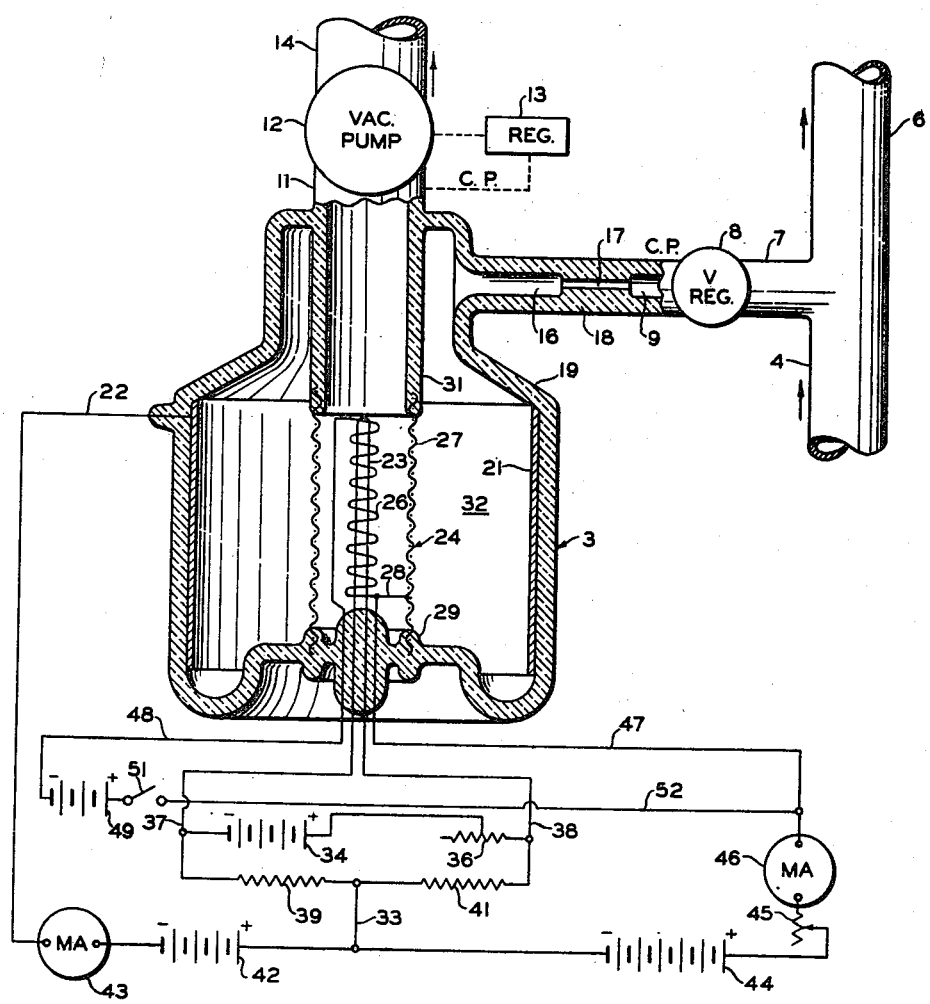
Figure 1 is an elevational view with parts in cross section of an ionization tube and means to supply the same with a stream of gas to be tested embodying the present invention, along with a wiring diagram for the same.

In Figure 1 a device for indicating changes in the composition of a gas by ionization currents generally designated as 3 is attached to a pipe 4 containing a flowing stream of gas which passes out through pipe 6. A small amount of this gas is constantly being drawn into instrument 3 through pipe 7 under the control of a constant pressure regulating valve 8 which is designed to maintain the pressure in space 9 at a substantially constant pressure.

Also connected to apparatus 3 is an exhaust pipe 11 by which the interior of 3 is exhausted to a substantially constant pressure of approximately $10^{-3}$ mm. of mercury by means of any suitable vacuum pump 12. Vacuum pump 12 is regulated by constant pressure regulator 13 which may be of any usual type, regulator 13 being controlled as shown by the dotted lines between the pressure regulator 13 and tube 11. Vacuum pump 12 discharges through line 14 to the atmosphere. In many installations with various types of vacuum pumps 12, it has been found that one pump alone does not provide a constant enough vacuum and it is customary to use separate pumps (not shown) in series in pipe 14 with pump 12. For example, pump 12 could be a VMF-20 oil diffusion pump and downstream in line 14 (not shown) and connected in series therewith a VMF-5 oil diffusion pump and then a Welch duo seal fore pump. Also in line 11 before entering pump 12 an ice trap (not shown) may be provided. Chambers containing desiccant (not shown) could supplement the ice trap if the gas being tested contains water vapor. As such elaborations on vacuum pump 12 are well known in the art of evacuating vessels it is not believed desirable to confuse the invention by elaborating on the type of vacuum pump system used at 12, it being understood that any suitable system known to the prior art for producing a vacuum in the neighborhood of $10^{-3}$ mm. of mercury which can be regulated to give a relatively constant pressure in tube 11 is satisfactory in the practice of the present invention.

The pressure in the space 9 is of course considerably higher than $10^{-3}$ mm. of mercury because it is difficult to find a regulating valve 8 which is accurate at such a pressure; however, any system known to the prior art for getting the pressure in line 4 down to the desired pressure in space 16 may be employed. I prefer however to employ a restricted orifice 17 in a thickened portion 18 of tube 7 so that the pressure in space 9 may be in the neighborhood of 2 mm. of mercury while that in space 16 and space 11 is approximately $10^{-3}$ mm. of mercury.

While other shapes of apparatus may be employed provided the principle of operation is the same, it is preferred to use as the ionization tube 19 of apparatus 3 a cylindrical tube preferably made of glass. A plate 21 is provided inside the tube, which plate should have a considerable extent and preferably extends entirely around the tube to serve as the ion collector plate. I find the best way of forming this plate is to vaporize and deposit platinum on the glass surface of tube 19. Metallic plate 21 is connected to wire 22. A source of negative electrons is provided and is shown in the form of a naked tungsten metal filament 23. Other metal filaments may be employed provided they are not poisoned by gases.

Obviously other types of heated cathodes may be employed, for example, the filament 23 may be sheathed in a porcelain tube (not shown) which porcelain tube is heated to incandescence and this porcelain tube may have metallic substances such as tungsten metal deposited thereon. However, it is not believed necessary to go into detail on the electron emissive cathode 23 as such cathodes are well known in the electron art and any type producing slow electrons is satisfactory. By slow electron I mean an electron having a velocity within the ranges understood by those skilled in the art which upon being accelerated by grid 24 would be suitable for causing the formation of positive ions in the gas in the pressure of $10^{-3}$ mm. of mercury. I have chosen a pressure of the magnitude of about $10^{-3}$ mm. of mercury because at that pressure positive ions are more easily and more uniformly formed by electron bombardment, but those skilled in the art can easily predict the amount this pressure can be changed without departing from the present invention, for as long as the same type of operation occurs the process is unchanged and the present invention is being employed.

Between the electron source 23 and the positive collection plate 21 I prefer a positive charged grid generally designated as 24. Grid 24 is preferably composed of two elements, the first being a helical wire 26 suitable for degassing the metallic parts of tube 19, as will be explained later, and a gauze wire cylinder 27 maintained at the same potential by wire 28. Tube 27 extends entirely around filament 23 but to avoid confusion, has not been drawn except where it is in section, as drawing all of the wires in cylinder 27 in back of filament 23 would make it almost impossible to see filament 23.

While the particular mode of supporting grid 27 is immaterial I prefer to imbed the lower end in an annular glass boss 29 formed in the wall of tube 19 and the upper end of 27 is similarly imbedded in the lower end of tube 31 which forms an extension of tube 11. It will be obvious that gas coming from 16 passes in space 32 between plate 21 and grid 27 before passing through grid 27 and out tube 31 and tube 11, and it will also be obvious that any of the gas which contacts heated filament 23 and is thermally cracked thereby will pass up tube 31 without reaching plate 21.

The wiring diagram will now be explained. In order to have a reference point let us say that wire 33 is at an intermediate potential. Filament 23 is at the same potential at the top of the filament but there is a difference of about the magnitude of 5 volts provided by battery 34 and rheostat 36 between the ends of the filament which are connected to wires 37 and 38. Most of the current from battery 34 is forced to go through wires 37 and 38 by relatively high resistances 39 and 41, which however allow wire 33 to be at the same average potential as filament 23.

Plate 21 is preferably maintained at a lower potential than filament 23, but this is not essential as long as plate 21 is at a considerably lower potential than grid 27 in order that positive ions created in the space between grid 27 and plate 21 will be urged toward plate 21 by electrostatic forces and will conduct a current thereby to plate 21. As shown in the drawing it is preferred to provide a battery 42 which will keep plate 21 about 12 volts or so below the potential of filament 23 and about 80 or 90 volts below the potential of grid 27.

In the process of maintaining plate 21 at this potential it is necessary for current to flow from battery 42 through a milliammeter 43 to wire 22 because a current is being conducted by positive electrons between grid 27 and plate 21. Milliammeter 43 therefore measures the magnitude of this current.

The main sources of difference in potential between plate 21 and grids 26 and 27 is battery 44, which is connected through instrument 46 with wire 47 leading to grid 26 and through wire 28 to grid 27. Battery 44 is preferably controlled by rheostat 45 to maintain a constant grid to filament current. Battery 44 is preferably in the neighborhood of 75 volts and in combination with battery 42 provides about 87 volts potential drop between grid 27 and plate 21. During normal operation milliammeter 46 indicates a filament to grid current of about 5 milliamperes.

After relatively long continued use, and after any time the vacuum in tube 19 has been broken and air or other gas under substantially atmospheric pressure has been in space 32, I have found that gas becomes occluded in the metal parts especially filament 23, grid 26 and grid 27. It thereupon becomes desirable to drive off this occluded gas because such gas tends to reduce the accuracy of the readings. For this purpose a wire 48 is connected to helical filament 26 and through battery 49, switch 51 and wires 52 and 47 to the other end of grid 26. When switch 51 is closed, grid 26 is heated up by a suitable current from battery 49. I prefer battery 49 to be about 6 volts and pass a current of 4 or 5 amperes through grid 26.

It should be realized that while for illustrative purposes specific voltages, potentials and the like have been given, the invention is not limited thereby or thereto as any electronic engineer can modify these voltages and other electrical relationships within suitable ranges and still practice the present invention.

Figure 2:
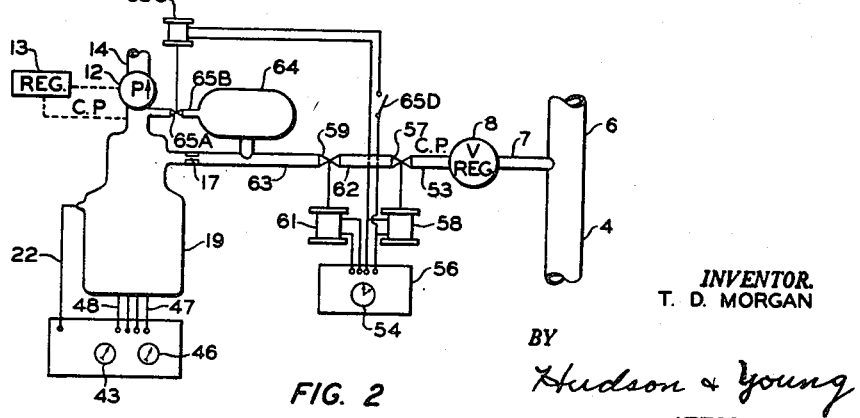
Figure 2 is an elevational view of a similar system employing the same type of ionization tube but having a modified system for supplying gas.

In Figure 2, tube 19 is exactly the same as in Figure 1 and therefore is given the same reference numerals. The same is true of wires 22, 47, 48 and milliammeters 43 and 46 and the electrical circuit between said milliammeters and said tube. Pump 12, regulator 13 and exhaust pipe 14 are also the same and so are pipes 4, 6, 7 and regulator 8.

Between regulator 8 and restricted orifice 17, however, a different form of apparatus has been inserted in order to regulate the pressure in tube 19 to a pressure in the neighborhood of $10^{-3}$ mm. of mercury. Regulator 8 discharges into pipe 53 at a constant pressure. A clock 54 drives a valve operating mechanism 56. This valve operating mechanism 56 first opens valve 57 by means of solenoid valve operator 58. Valve 59 is closed, valve 57 is reclosed and then valve 59 is opened by solenoid 61 controlled by clock 54 whereupon the gas in tube 62 expands from its pressure of several mm. of mercury and passes through pipe 63 into storage chamber 64 to provide a source of gas. Valve 59 is then closed. Gas from 64 leaks uniformly through orifice 17 into tube 19 where the operation becomes the same as in Figure 1.

When intermittent operation is desired, valve 65A is actuated along with valve 57 to open flow through pipe 65B by closing switch 65D so that solenoids 65C and 57 are in parallel and operate in unison. While 62 fills through valve 57, parts 63 and 64 are rapidly evacuated through pipe 65B by pump 12.

While the size of orifice 17 may be varied considerably I have obtained satisfactory results by making this orifice by punching a hole about 20 microns in diameter in a 0.0003″ platinum plate with a sharpened needle and mounting the plate in the glass tube (not shown), or by forming a fine hole in the glass as shown.

OPERATION

The operation of Figure 1 will now be described. Vacuum pump 12 is started up and the pressure in space 32 of tube 19 is lowered to somewhere in the neighborhood of $10^{-3}$ mm. of mercury. Switch 51 is then closed a suitable length of time, say about 15 minutes, during which time grid 26 becomes incandescent, driving any occluded gases out of itself, out of filament 23, out of grid 27 and plate 21. As fast as these occluded gases are driven off they are removed through pipe 11 by vacuum pump 12, switch 51 is then opened and pump 12 continues to pump out tube 19, grid 26 cools down and the system comes into a relatively stable state in a few minutes.

In this relatively stable state a relatively uniform representative sample of gas from pipe 4 is passing through regulator 8, through orifice 17, through space 32 between plate 21 and grid 27, through the meshes of grid 27 and on out through pipes 31 and 11 to vacuum pump 12.

Filament 23 is heated by battery 34 and is emitting slow electrons. A certain constant proportion of these slow electrons are accelerated by, attracted to and collide with positively charged grids 26 and 27, but a relatively constant number of electrons pass through grid 27 out into space 32 where they collide with gas molecules forming positive ions in the process of such collisions. At the selected predetermined uniform pressure, such as $10^{-3}$ mm. of mercury, the number of positive ions formed varies with the type of gas molecule struck by the electrons, while a certain constant proportion of these electrons are attracted by and fall back into grid 27. Therefore for any constant pressure in space 32 there is a definite number of positive ions formed per second depending on the composition of the gas in the space.

The positive ions in space 32 are in an electrostatic field because grid 27 is charged at a higher potential (preferably about 80 to 90 volts higher) than plate 21. The force of this electrostatic field moves the positive ions steadily over to plate 21 and because of this ion current the battery 42 is caused to supply an equivalent current through milliammeter 43 where it is indicated. Milliammeter 43 can be a recording milliammeter if desired, and in fact can be used to control machinery (not shown) which exists in the prior art, which can be so operated, by which the milliammeter 43 can control the process (not shown) producing the gas in pipe 4. However I prefer to merely indicate the change in the composition of gas, and then have someone investigate why this change is taking place and make suitable adjustments to restore the former composition of gas in pipe 4. Modern electronic controls are quite sensitive and can be operated by milliammeters, or by low level currents.

While milliammeter 43 is indicating the rate of ionization of the gas, milliammeter 46 is merely indicating the grid to filament current in tube 19 and should read a steady value in order to provide accurate operation of the device. Any desired steady grid to filament current can be maintained by adjusting rheostat 45 from time to time. While this can be done manually, it is obviously preferable to substitute one of the many constant current controls now on the market, as such an automatic electronic current control circuit (not shown) can do a better job of regulating the current in wire 47 to about 5 milliamperes than manual operation of rheostat 45.

The operation of Figure 2 is very similar except for the means of lowering the pressure from line 4 down to that necessary in tube 19. In many plant operations the pressure in line 4 is too high to permit a single stage reduction of pressure by regulator 8, so in Figure 2 the pressure having been made constant by regulator 8 in pipe 53, a definite volume in pipe 62 of this gas under the pressure in pipe 53 is collected in pipe 62 by opening valve 57 and closing the same and then this gas is passed to storage vessel 64 at a low pressure by opening valve 59 and closing the same. The gas in vessel 64 is at a substantially uniform pressure during the cycles employing valves 57 and 59 and by the time this gas passes through orifice 17 into chamber 19 it is at a substantially constant reduced pressure as desired.

It should be noted that after the gas passes through positively charged grid 27, it contacts heated filament 23 and is thereby cracked to form a different gas, that any positive ions formed in this different gas by electrons emitted from filament 23 cannot get through grid 27 because they are repelled by the positive charge on the grid, and therefore they must pass up tube 31 and be exhausted by pump 12. Therefore it does not matter that filament 23 changes the composition of the gas by cracking because grid 27 protects the instrument from any variation in measurements due to the same. Other irregularities in ionization of the gas, such as thermal cracking and formation of ions on the surface of the filament itself, make the complete removal of gas passing close to the filament essential in order to achieve a high degree of accuracy.

*Example I*

The reading of milliammeter 43 will vary from instrument to instrument, the relative readings will be different for the different gases and about of the order set forth in the following table. This table is made at a constant pressure of $10^{-3}$ mm. of mercury. Obviously all comparative tests should be made at the same constant pressure, as varying the pressure varies the amount of ionization. This selected constant pressure can be chosen from a quite wide range of pressures, however, but preferably is chosen from the best range of operation, which runs from $10^{-2}$ mm. to $10^{-8}$ mm. of mercury, and I prefer the neighborhood of $10^{-3}$ mm. of mercury, as the best range to operate it. Once the pressure is selected it is maintained constant as closely as it is possible to do so.

TABLE 1

| | Molecular Weight | Ion Gauge Reading |
|---|---|---|
| Methane | 16 | 4.66 |
| Ethylene | 28 | 2.94 |
| Ethane | 30 | 8.07 |
| Propylene | 42 | 3.69 |
| Propane | 44 | 9.48 |
| Butadiene 1,3 | 54 | 1.26 |
| Butene-1 | 56 | 2.60 |
| Cis-butene-2 | 56 | 2.85 |
| Trans-butene-2 | 56 | 3.18 |
| Isobutylene | 56 | 2.83 |
| n-Butane | 58 | 7.25 |
| Isobutane | 58 | 8.47 |

It should be obvious that if only butene-1 and butadiene are present in tube 4 a reading intermediate 2.60 and 1.26 will be given at milliammeter 43. By tests of known amounts of these gases a calibration table can be prepared from which the reading can be translated into definite percentages of each component. Other similar uses are obvious with more than two gases where only one gas varies. Other uses are suggested to those skilled in the art by this example.

While I have shown and described a certain arrangement of parts for carrying out the process of my invention and have described certain specific processes, these have been for purpose of illustration and obviously my invention is not limited thereto but instead is as defined in the following claims.

Having described my invention, I claim:

1. In a device of the character described an evacuated chamber, and means to regulate the pressure in said chamber comprising vacuum pump means for evacuating said chamber to a predetermined pressure, and means supplying gas to maintain said pressure comprising a source of said gas at greater than atmospheric pressure, a conduit connecting said source and said chamber, a constant pressure regulating valve in said conduit receiving gas from said source and passing it under reduced pressure through said conduit, a pair of cut-off valves in said conduit downstream of said regulating valve, means to open and close said cut-off valves in order whereby that portion of said conduit between them acts as a metering chamber, a pressure equalizing chamber connected to said conduit downstream of said last cut-off valve, and a restricted orifice controlling flow from said conduit into said evacuated chamber.

2. In a device of the character described an evacuated chamber, and means to regulate the pressure in said chamber comprising vacuum means for evacuating said chamber to a predetermined pressure, and means supplying gas to maintain said pressure comprising a source of said gas, a conduit connecting said source and said chamber, a pressure regulating valve in said conduit receiving gas from said source and passing it under reduced pressure through said conduit, a pair of cut-off valves in said conduit downstream of said regulating valve, means to open and close said cut-off valves in order whereby that portion of said conduit between them acts as a metering chamber, a pressure equalizing chamber connected to said conduit downstream of said last cut-off valve, and a restricted orifice controlling flow from said conduit into said evacuated chamber.

3. In a device of the character described an evacuated chamber, and means to regulate the pressure in said chamber comprising vacuum pump means for evacuating said chamber to a predetermined pressure, and means supplying gas to maintain said pressure comprising a source of said gas, conduit connecting said source and said chamber, a constant pressure regulating valve in said conduit receiving gas from said source and passing it under reduced pressure through said conduit, a pair of cut-off valves in said conduit downstream of said regulating valve, means to open and close said cut-off valves in order whereby that portion of said conduit between them acts as a metering chamber, a pressure equalizing chamber connected to said conduit downstream of said last cut-off valve, and a restricted orifice controlling flow from said conduit into said evacuated chamber.

4. In a device of the character described an evacuated chamber, and means to regulate the pressure in said chamber comprising vacuum pump means for evacuating said chamber to a predetermined pressure, and means supplying gas to maintain said pressure comprising a source of said gas at greater than atmospheric pressure, a conduit connecting said source and said chamber, a constant pressure regulating valve in said conduit receiving gas from said source and passing it under reduced pressure through said conduit, a pair of cut-off valves in said conduit downstream of said regulating valve, means to open and close said cut-off valves in order whereby that portion of said conduit between them acts as a metering chamber, and a restricted orifice controlling flow from said conduit into said evacuated chamber.

5. In a device of the character described an evacuated chamber, and means to regulate the pressure in said chamber comprising vacuum means for evacuating said chamber to a predetermined pressure, and means supplying gas to maintain said pressure comprising a source of said gas, a conduit connecting said source and said chamber, a pressure regulating valve in said conduit receiving gas from said source and passing it under reduced pressure through said conduit, a pair of cut-off valves in said conduit downstream of said regulating valve, means to open and close said cut-off valves in order whereby that portion of said conduit between them acts as a metering chamber, a pressure equalizing chamber connected to said conduit downstream of said last cut-off valve, and a restricted orifice controlling flow from said conduit into said evacuated chamber.

6. The process of regulating the pressure in a chamber comprising the steps of evacuating said chamber to a predetermined pressure, supplying a gas to maintain said pressure from a source of said gas at a greater than atmospheric pressure by regulating the gas coming from said source to a constant pressure, metering said gas under constant pressure into a metering zone, passing said metered gas into a pressure equalizing zone and equalizing the pressure therein, and diffusing said gas from said equalizing zone through a restricted orifice into said chamber.

7. In a device of the character described an evacuated chamber, and means to regulate the pressure in said chamber comprising vacuum means for evacuating said chamber to a predetermined pressure, and means supplying gas to maintain said pressure comprising a constant pressure source of said gas, a conduit connecting said source and said chamber, a pair of cut-off valves in said conduit, means to open and close said cut-off valves in order whereby that portion of said conduit between them acts as a metering chamber, a pressure equalizing chamber connected to said conduit downstream of said last cut-off valve, and a restricted orifice controlling flow from said conduit into said evacuated chamber.

8. The process of regulating the pressure in a chamber comprising the steps of evacuating said chamber to a predetermined pressure, supplying a gas to maintain said pressure from a source of said gas at constant pressure, metering discrete volumes of said gas under constant pressure into a metering zone, passing said metered gas into a pressure equalizing zone and equalizing the pressure therein, and diffusing said gas from said equalizing zone through a restricted orifice into said chamber.

THOMAS D. MORGAN.

References Cited in the file of this patent

UNITED STATES PATENTS

| Number | Name | Date |
| --- | --- | --- |
| 2,569,032 | Washburn | Sept. 25, 1951 |